(12) United States Patent  (10) Patent No.: US 8,235,185 B2
Formolo  (45) Date of Patent: Aug. 7, 2012

(54) SIDE REINFORCED RAILWAY BRAKE SHOE

(75) Inventor: Joseph F. Formolo, Laurinburg, NC (US)

(73) Assignee: RFPC Holding Corp., Wilmerding, PA (US)

( * ) Notice: Subject to any disclaimer, the term of this patent is extended or adjusted under 35 U.S.C. 154(b) by 577 days.

(21) Appl. No.: 12/186,745

(22) Filed: Aug. 6, 2008

(65) Prior Publication Data

US 2010/0032253 A1  Feb. 11, 2010

(51) Int. Cl.
F16D 69/00 (2006.01)
(52) U.S. Cl. .............. 188/251 R; 188/33; 188/250 R
(58) Field of Classification Search .......... 188/251 R, 188/29, 33, 252, 254, 250 R, 251 A, 250 B
See application file for complete search history.

(56) References Cited

U.S. PATENT DOCUMENTS

| | | | |
|---|---|---|---|
| 2,861,964 A | 11/1958 | de Gaugue, Jr. et al. | |
| 4,219,452 A * | 8/1980 | Littlefield | 523/149 |
| 4,371,631 A | 2/1983 | Peters | |
| 4,781,275 A | 11/1988 | Olsen | |
| 5,083,643 A | 1/1992 | Hummel et al. | |
| 5,341,904 A | 8/1994 | Christie | |
| 5,657,839 A | 8/1997 | Kahr | |
| 6,241,058 B1 | 6/2001 | Shute et al. | |
| 6,474,452 B2 | 11/2002 | Velayutha | |
| 6,581,732 B1 | 6/2003 | Shute et al. | |
| 2002/0053492 A1 | 5/2002 | Velayutha | |
| 2007/0151817 A1* | 7/2007 | Kahr et al. | 188/250 R |
| 2009/0139809 A1* | 6/2009 | Bowden et al. | 188/250 B |

FOREIGN PATENT DOCUMENTS

| | | |
|---|---|---|
| CA | 2313727 A1 | 2/2001 |
| CA | 2319877 A1 | 4/2001 |
| HU | 224732 B1 | 3/2004 |
| PL | 170619 B1 | 9/1994 |
| PL | 186358 B1 | 6/1999 |
| RU | 2188347 C1 | 8/2002 |
| RU | 2317906 C1 | 2/2008 |

OTHER PUBLICATIONS

V.I. Crylov et al., "Braked devices of railway vehicle", Vehicle, 1989, pp. 364-365.

* cited by examiner

Primary Examiner — Pamela Rodriguez
(74) Attorney, Agent, or Firm — The Webb Law Firm

(57) ABSTRACT

A molded brake shoe formed of friction material with or without a metal backing. Along at least a portion of at least one side surface of the brake shoe there is a layer of the molded friction material reinforced with a fiber.

10 Claims, 2 Drawing Sheets

SIDE REINFORCED RAILWAY BRAKE SHOE

BACKGROUND OF THE INVENTION

1. Field of the Invention

This application is directed to the art of composite brake shoes.

2. Description of Related Art

Railcars are supported and guided by steel wheels. The treads at the outer circumference of the wheels ride over steel rails. Railcar brakes comprise brake shoes that are brought into frictional engagement with the wheel treads. The brake shoes are supported by brake heads which, in turn, are movably supported by the brake rigging comprised of a system of levers and a pneumatic cylinder. Brake shoes are comprised of various materials that are selected for their frictional characteristics and for the effect on the wear life of the wheel treads. Many brake shoes are composites of materials having different characteristics. In typical composite brakes shoes, materials of differing frictional characteristics bear upon the wheel tread during braking. This may be achieved by placing inserts of a different material into the friction face of the shoe comprised of the principal brake shoe material.

Standard railway brake shoes in North America are produced with metal backing plates for support of the friction material and for attachment and retention of the brake shoes to the brake heads. Elsewhere in the world, brake shoes are produced without metal backing plates and normally include a skeletal wire frame. One type of railway brake shoe also includes a metallic insert solidly affixed by welding to the metal backing plate before the brake pad is formed, for example, by molding, onto the backing plate. See U.S. Pat. No. 6,241,058 entitled "Brake Shoe with Insert Bonded to Backing Plate." Recently, metallic inserts have been introduced into brake shoes without the metal backings as taught in PCT/US2007/069854 entitled "Railway Brake Shoe."

The brake shoe friction material often comprises a blend of abrasive materials, organic and inorganic filler materials, and resins. The metallic insert may be selected to provide beneficial treatment of the rolling surface of the wheel.

Fiber reinforced resilient backing layers between the friction material and metal backing plates have been suggested to attenuate sound. See U.S. Pat. No. 4,371,631 entitled "Backing Plate Composition for Brake Shoes."

SUMMARY OF THE INVENTION

It is an advantage, according to this invention, to provide structural reinforcement at side layers of a brake shoe to reduce the formation and propagation of cracks.

Brake shoes have a friction surface which, during braking, bears on the convex rolling surface of the railcar wheel. The rolling surface of the wheel is a surface of rotation that may be a convex-conical surface or a combination of convex-conical and cylindrical surfaces or other surfaces of rotation. The surface of the brake shoe has a concave surface of rotation that matches a portion of the convex surface of the wheel. These surfaces of rotation are defined by a generatrix (not necessarily straight line) rotated around an axis which is defined by the wheel axle. Thus, the friction surface of the brake shoe has a generally axial and a circumferential extent and the brake shoe has a radial thickness moving away from the friction surface. The features of the brake shoes, according to various embodiments of this invention, will be described herein with reference to the generally axial, circumferential and radial directions.

Briefly, according to one embodiment of this invention, a brake shoe with or without a metal backing is provided. The brake shoe is defined by a friction surface for bearing upon a wheel tread and a radially opposed back surface for being placed in contact with and secured to a brake head and two side surfaces that extend between the friction surface and the back surface. The brake shoe has a metal insert comprising two spaced bodies having faces lying in the friction surface of the brake shoe. The spaced bodies extend radially away from the friction surface and to the back surface of the brake shoe. The brake shoe is comprised of molded friction material comprising a blend of abrasive materials, fillers, and resin. Along at least a portion of at least one side surface adjacent the spaced metal insert bodies, there is a layer of fiber-reinforced material. The fiber-reinforced material may be molded friction material reinforced with fibers.

According to this invention, the sides of the brake shoe are strengthened to reduce cracks due to thermal or mechanical stresses during braking by adding fiber/composition material to the sides of the brake shoes during the molding process. During the molding process, heat and pressure cause the fiber/composition material to be integrally molded and adhered to the friction material comprising the bulk of the brake shoe with which it is compatible.

When used with brake shoes having metal inserts and when located adjacent to the metal inserts, the reinforcement layers along the side surfaces are particularly effective in preventing formation and propagation of cracks between the molded friction material and the metal inserts.

Preferably, the fiber material may comprise woven or stitched fabric of fiberglass, aramid fibers, cotton fibers etc. impregnated with a phenolic or other resin. The composition of the reinforcement layers must be selected so that the reinforcement layers wear at substantially the same rate as the bulk friction composition.

BRIEF DESCRIPTION OF THE DRAWINGS

Further features and other objects and advantages will become apparent from the following detailed description of preferred embodiments made with reference to the drawings in which.

DESCRIPTION OF THE PREFERRED EMBODIMENTS

Figure 1:
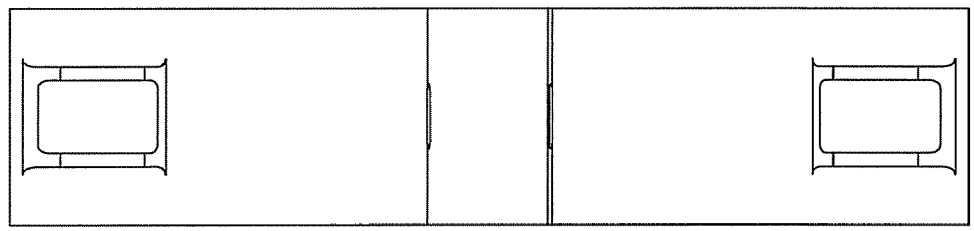
FIGS. 1, 2, and 3 are back, side, and friction face views of a brake shoe having a metal insert.
Figure 2:
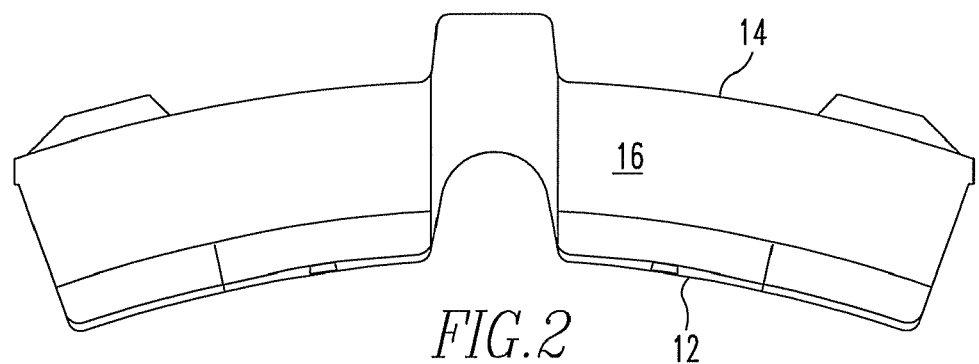
Figure 3:
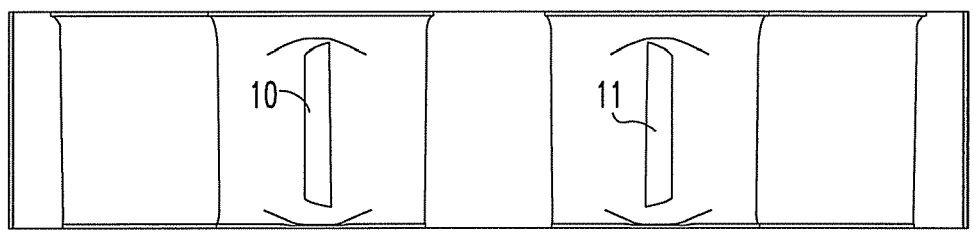
Figure 4:
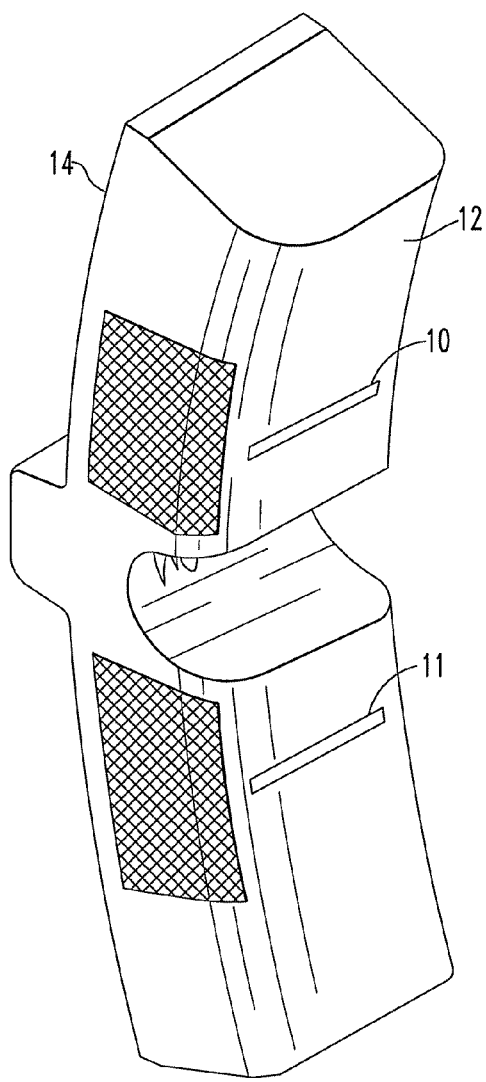
FIG. 4 is a perspective view of a brake shoe with a partial side reinforcement layer.
Figure 5:
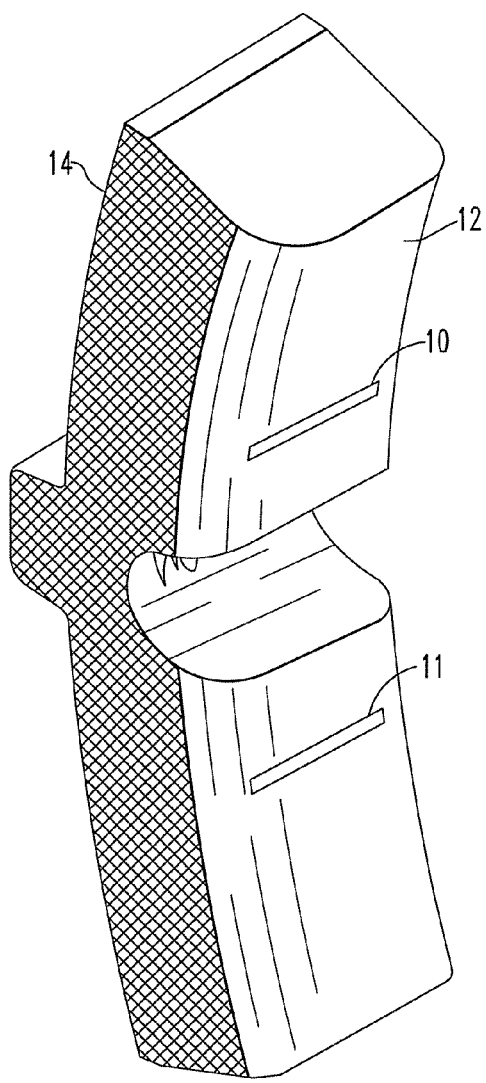
FIG. 5 is a perspective view of a brake shoe with a full side reinforcement layer.

The function of a composition railway brake shoe is to provide braking effort in the form of friction generating a retarding force on the rolling surfaces of the wheels of a railcar. Referring to FIGS. 1 to 5, the brake shoe structure is typically an arc-shaped block designed with one friction surface 12 to fit against the circumference of the wheel and at its radially spaced back surface 14 to be mounted to a supporting member of the brake system which applies force to the brake shoe during braking. Extending between the friction surface 12 and back surface 14 are side surfaces 16. The brake shoe may include a metal backing plate on or embedded in its back surface for attachment to the supporting member of the brake system. The brake shoe may include metal inserts 10 and 11 which project through the thickness of the composition material to provide improved wearability or conditioning of the wheel surface, and/or to improve rolling adhesion between the railcar wheel and rails.

Due to several factors, stresses are developed on various specific locations of the brake shoe structure that can cause cracking or breakage of the brake shoe structure during use. The factors may include the following: a) the curved shape of the brake shoe, b) discontinuities between the composition and the metal insert or metal backing plate, c) high normal application forces and tangential friction forces occurring during braking, d) cyclical vibration and shock loadings during brake release, e) irregular fit between the friction surface of the brake shoe and the wheel, and f) non-uniform force distribution due to irregular mating between the back surface of the brake shoe and the supporting member of the brake system.

Cracks in the back of the brake shoe which develop due to various stress factors may be superficial or they can represent significant safety issues having the potential for breakage and loss of function.

It is an advantage of this invention to reduce the likelihood of breakage and loss of function by reinforcing the side surface layer of the brake shoe structure.

In one embodiment according to this invention, side reinforcement layers are prepared in advance of molding the brake shoe. The reinforcement layers are composed of a resilient composite material that encapsulates one or more layers of fiber reinforcement and are compatible with the bulk composition braking material of the brake block. The reinforcement layers are made integral with the brake block by positioning the reinforcing layers in the mold prior to molding the brake block. According to another embodiment, sheets of fibrous material impregnated with resin may be bonded to the side surface of the brake shoe either during or after the brake shoe molding process.

Having thus defined my invention in the detail and particularity required by the Patent Laws, what is desired protected by Letters Patent is set forth in the following claims.

The invention claimed is:

1. A molded brake shoe comprising a generally arch-shaped block formed of friction material comprising abrasive material, fillers, and resin and defining a friction surface for bearing upon a wheel tread, a radially opposed back surface for being placed in contact with and secured to a brake head and elongate side surfaces extending between the friction surface and the back surface and wherein a distinct layer of fiber-reinforced material for strengthening the block is molded to at least a portion of at least one of the side surfaces during molding of the block.

2. A molded brake shoe comprising a generally arch-shaped block formed of friction material comprising abrasive material, fillers, and resin and defining a friction surface for bearing upon a wheel tread and a radially opposed back surface for being placed in contact with and secured to a brake head and elongate side surfaces extending between the friction surface and the back surface, the block comprising at least one metal insert therein facing the friction surface, and wherein a distinct layer of fiber-reinforced material for strengthening the block is molded to at least a portion of at least one of the side surfaces during molding of the block.

3. The molded brake shoe according to claim 1, wherein the layer of fiber-reinforced material covers the entirety of at least one of the side surfaces.

4. The molded brake shoe according to claim 1, further comprising a metal backing plate on the back surface.

5. The molded brake shoe according to claim 1 or 2, wherein the fiber-reinforced material comprises woven or stitched fabric of fiberglass, aramid fibers, or cotton fibers impregnated with phenolic or other resin.

6. The molded brake shoe according to claim 2, wherein the composition of the layer of fiber-reinforced material is selected so that the layer of fiber-reinforced material wears at substantially the same rate as the friction material comprising abrasive material, fillers, and resin.

7. The molded brake shoe according to claim 2, wherein the layer of fiber-reinforced material covers the entirety of at least one of the side surfaces.

8. The molded brake shoe according to claim 2, wherein the at least one insert comprises a face at the friction surface of the brake shoe.

9. The molded brake shoe according to claim 8, wherein the at least one insert extends radially inward into the block from the friction surface.

10. The molded brake shoe according to claim 2, further comprising a metal backing plate on the back surface.

\* \* \* \* \*

UNITED STATES PATENT AND TRADEMARK OFFICE
CERTIFICATE OF CORRECTION

PATENT NO.         : 8,235,185 B2
APPLICATION NO.    : 12/186745
DATED              : August 7, 2012
INVENTOR(S)        : Joseph F. Formolo It is certified that error appears in the above-identified patent and that said Letters Patent is hereby corrected as shown below:

Column 4, Line 3, Claim 1, after "surface" insert -- , --

Signed and Sealed this
Thirteenth Day of November, 2012

David J. Kappos
*Director of the United States Patent and Trademark Office*